Patented Apr. 9, 1935

1,997,172

UNITED STATES PATENT OFFICE 1,997,172

PROCESS FOR THE CATALYTIC PRODUCTION OF ESTERS

Stefan Goldschmidt, Berlin, Germany, and Erich Littmann, Haifa, Palestine, assignors to Kessler Chemical Corporation, New York, N. Y., a firm No Drawing. Application April 14, 1934, Serial No. 720,564. In Germany September 28, 1932

12 Claims. (Cl. 260—106)

This invention relates to a process for the catalytic production of esters and alcohols by the reduction of volatile fatty acids.

It may be regarded as an established fact that the carboxyl group is accessible to reduction in acid derivatives as the esters. Reduction leads to alcohols corresponding with the fatty acids, or under certain circumstances even to substitution of the carboxyl group by the methyl group. As regards the reduction from a technical point of view, it has been proposed to subject the fatty substances at high pressures to reaction with hydrogen over suitable catalysts. Solutions of the fatty substances in low-molecular alcohols have also been reduced at pressures of more than 13.5 atm. to alcohols, or esters of the basic acids with the resulting alcohols.

On the other hand it appeared less certain whether the carboxyl groups present in the free fatty acids were also accessible to catalytic reduction. Certainly it has been contended at different times that the carboxyl group of the fatty acids itself may be reduced at high pressure over suitable catalysts with formation of the corresponding alcohols or esters of the formed alcohols and the acids employed. The experimental reports, however, which have been advanced in this connection would not appear to be reliable. Thus, for example, reference has been made to the reduction of stearic acid at 230° C. and at a pressure amounting to 200 atm. over activated cobalt, it being remarked, however, at the same time that the reaction is interrupted when the saponification figure becomes half that of the initial material.

It would accordingly appear doubtful whether it is really stearic acid or merely an ester of the stearic acid which is reduced.

The statements hitherto made with regard to the possibility of reducing the carboxyl group of free fatty acids with hydrogen without the use of pressure are even more unreliable and contradictory. Thus, for example, it has been stated that free fatty acids are unsuitable for hydrogenation without pressure, and that merely the volatile compounds thereof, such as fatty acid ethyl ester may be used (Schönfeld: "Hydrierung der Fette", page 138). It has also been doubted whether even fatty acid ethyl esters, such as oleic ester, are capable of being hydrogenated without pressure such as previously contended.

It was accordingly extremely surprising when it was found that all fatty acids, the boiling point of which is situated below the temperature at which the carboxyl group of the fatty acid is reduced, with the exception of formic acid, may be converted almost completely in the gas phase at atmospheric pressure, or at pressures situated merely very little above the same, into the esters of the basic acids with the alcohol resulting from the reduction, the vapors thereof being conducted in admixture with hydrogen over suitable catalysts. The alcohol resulting from the reaction may appear in varying amounts as by-product of the ester, dependent on the choice of conditions under which the experiment is conducted. Aldehyde resulting from the reduction is also to be found at times in very small amount among the reaction products. Suitable catalysts have been found to be mixed catalysts containing essentially a readily reducible oxide, such as oxides of silver, nickel and copper, and an oxide which is difficult to reduce, such as oxides of thorium, vanadium and more particularly chromium. The mixed catalysts may also be applied to suitable supports, such as pumice stone, fragments of clay, etc. When employing supports acting in dehydrating fashion it is possible to convert the disappearing acid into ester in practically equal quantity. The temperature suitable for the reaction is located between 280° and 400° C. If this upper temperature limit is exceeded, increasing quantities of other reaction products, which are not esters, are obtained as the temperature increases.

Whereas it has been contended in the appertaining literature that for the practical reduction of fatty substances only hydrogenation under pressure would enter into the question, it is shown by the new process that free fatty acid may be converted in technically useful fashion into esters or alcohols without the use of pressure. The technical advantage obtained in face of the pressure hydrogenation process consists inter alia in a very much cheaper apparatus and in the continuous nature of the process.

*Example 1.*—An equimolecular amount of crystallized copper nitrate and chromium nitrate were intimately mixed, and thereupon dehydrated carefully at a raised temperature, heating finally being carried to red-heat for such length of time until nitrous gases no longer escaped. The oxides ultimately remaining, after cooling, were applied in moist condition to silica gel. After drying the finished catalyst was reduced at a temperature not exceeding the reaction temperature.

Over 190 cc. of the catalyst produced in the manner described there was conducted at a temperature between 310° and 340° C. a mixture of butyric acid vapors and hydrogen. The rate of the hydrogen flow amounted to 4 liters per hour, and the rate of flow of the butyric acid was 6 g. per hour. The reaction results in the conversion of 75% of the introduced butyric acid and of this amount 95% is converted into butyl butyrate. Merely traces of butyl alcohol and butyraldehyde could be found. Gaseous products of decomposition did not occur in any way during the reaction.

Example 2.—A solution of two molecules copper nitrate in water was mixed with an aqueous solution containing one mol. ammonium chromate, and the whole evaporated to the dry state. Finally, the heating was continued until the whole had been converted into the oxides. The preliminarily prepared oxides were then used in the manner according to Example 1. The catalyst, upon the reduction of butyric acid, behaved as regards its effect and the yield obtained, in exactly the same manner as the catalyst referred to in Example 1.

Example 3.—An equimolecular mixture of copper nitrate and chromium sulphate in aqueous solution was precipitated with sodium carbonate. The precipitated product was filtered, washed with water, and after drying heated to red heat. The mixture of oxides was applied in moist condition to pumice stone, and finally reduced by hydrogen at 300° C. The volume of the catalyst, the reaction temperature and the rate of flow of the butyric acid and the hydrogen were the same as in Example 1. After the reaction 50% of the acid introduced had disappeared. Of this missing acid 8% was again found in the form of butyraldehyde, 37% in the form of butyl alcohol, and 40% in the form of butyl butyrate.

Example 4.—Silica gel was saturated with a solution of silver nitrate, and the silver precipitated by an equivalent amount of ammonium chromate solution. The preliminarily prepared catalyst was dried, and heated to 400° C. in the reaction tube and reduced by means of hydrogen. Over this catalyst there was conducted at a temperature of 400° C. a mixture of butyric acid and hydrogen (volume of catalyst 190 cc., rate of flow of the butyric acid 3 g. per hour, rate of flow of the hydrogen 4 liters per hour). 40% of the butyric acid was converted. 35% of the reaction product consisted of butyl butyrate and 10% of butyl alcohol. In addition there were a number of other products which were not of the nature of alcohol or ester.

Example 5.—The catalyst was produced in the manner described in Example 3. Over 190 cc. of the catalyst there was passed at 350–360° C. isovaleric acid vapor in mixture with hydrogen. Rate of flow of the hydrogen 4 liters per hour, that of the acid 4 g. per hour. The decrease in acid amounted to 46.5%. Of the acid which disappeared there was obtained by distillation 3% in the form of isovaleric aldehyde, 19% in the form of isoamyl alcohol, and 77% in the form of isoamyl isovalerate. In this case the acid disappearing is also again found in its entirety in the form of useful reaction products.

Example 6.—The catalyst was produced in the manner described in Example 2. Over 190 cc. of this catalyst there were conducted at 340° C., 10 g. glacial acetic acid and 4 liters hydrogen per hour. 30% of the glacial acetic acid was converted, and 45% of the reaction product consisted of ethyl acetate.

Example 7.—Over 190 cc. of the catalyst produced in accordance with Example 1 there were conducted at 325° C. 5 g. propionic acid and 4 liters hydrogen per hour. 42% of the propionic acid was converted, and 53% of the reaction product consisted of propyl propionate.

Example 8.—Caproic acid was converted in the manner described in Example 2—reaction temperature 320° C. 40% of unchanged acid and 52% capryl caproate were obtained, the remainder consisting of capryl alcohol.

Example 9.—Caprylic acid was decomposed at 320° C. in the manner described in Example 2. In addition to 22.5% unchanged acid there was obtained 50% octyl caprylate, the remainder being octyl alcohol.

Example 10.—Palmitic acid was decomposed at 360° C. as described in Example 2. In addition to 15% unchanged acid there was obtained 70% cetyl palmitate, the remainder being cetyl alcohol.

Example 11.—Stearic acid was decomposed at 360–370° C. as described in Example 2. In addition to 8% unchanged acid 70% octodecyl stearate was obtained.

What we claim as new and desire to secure by Letters Patent is:

1. A process for the treatment of fatty acids other than formic acid, which comprises converting a fatty acid into corresponding ester and alcohol, said fatty acid having a boiling point below the temperature at which its carboxyl group is reduced, by conducting vapors of such fatty acid in admixture with hydrogen over a catalyst containing essentially a difficultly reducible oxide and a readily reducible oxide, at a temperature between 280° and 400° C., and at substantially atmospheric pressure.

2. A process for the treatment of fatty acids other than formic acid, which comprises converting a fatty acid into corresponding ester and alcohol, said fatty acid having a boiling point below the temperature at which its carboxyl group is reduced, by conducting vapors of such fatty acid in admixture with hydrogen over a catalyst containing essentially a difficultly reducible oxide, a readily reducible oxide, and a dehydrating substance at a temperature between 280° and 400° C., and at substantially atmospheric pressure.

3. A process for the treatment of fatty acids other than formic acid, which comprises converting a fatty acid into corresponding ester and alcohol, said fatty acid having a boiling point below the temperature at which its carboxyl group is reduced, by conducting vapors of such fatty acid in admixture with hydrogen over a catalyst containing essentially a difficultly reducible oxide and a readily reducible oxide, at a temperature upwards of 280° C. and at substantially atmospheric pressure.

4. A process for the treatment of fatty acids other than formic acid, which comprises converting a fatty acid into corresponding ester and alcohol, said fatty acid having a boiling point below the temperature at which its carboxyl group is reduced, by conducting vapors of such fatty acid in admixture with hydrogen over a catalyst containing essentially an oxide belonging to the group consisting of chromium oxide, thorium oxide and vanadium oxide, and an oxide of the group consisting of copper oxide, silver oxide and nickel oxide, at a temperature between 280° and 400° C., and at substantially atmospheric pressure.

5. A process for the treatment of fatty acids other than formic acid, which comprises converting a fatty acid into corresponding ester and alcohol, said fatty acid having a boiling point below the temperature at which its carboxyl group is reduced, by conducting vapors of such fatty acid in admixture with hydrogen over a catalyst containing essentially chromium oxide and copper oxide, at a temperature between 280° and 400° C., and at substantially atmospheric pressure.

6. A process for the treatment of fatty acids other than formic acid, which comprises converting a fatty acid into corresponding ester and alcohol, said fatty acid having a boiling point below the temperature at which its carboxyl group is reduced, by conducting vapors of such fatty acid in admixture with hydrogen over a catalyst containing essentially a difficultly reducible oxide, a readily reducible oxide and silica gel, at a temperature between 280 and 400° C., and at substantially atmospheric pressure.

7. A process for the treatment of fatty acids other than formic acid, which comprises converting a fatty acid into corresponding ester and alcohol, said fatty acid having a boiling point below the temperature at which its carboxyl group is reduced, by conducting vapors of such fatty acid in admixture with hydrogen over a catalyst containing essentially chromium oxide, copper oxide and silica gel, at a temperature between 280° and 400° C., and at substantially atmospheric pressure.

8. A process for the treatment of butyric acid, which comprises converting butyric acid into the corresponding ester and alcohol by conducting vapors of butyric acid in admixture with hydrogen over a catalyst containing essentially a difficultly reducible oxide and a readily reducible oxide at a temperature of 310° to 340° C., at substantially atmospheric pressure.

9. A process for the treatment of butyric acid, which comprises converting butyric acid into the corresponding ester and alcohol by conducting vapors of butyric acid in admixture with hydrogen over a catalyst containing essentially chromium oxide, copper oxide and silica gel at a temperature of 310° to 340° C., at substantially atmospheric pressure.

10. A process for the treatment of isovaleric acid, which comprises converting isovaleric into the corresponding ester and alcohol by conducting the vapors of isovaleric acid admixed with hydrogen over a catalyst containing essentially chromium oxide and copper oxide at a temperature of 350° to 360° C. at substantially atmospheric pressure.

11. A process for the treatment of acetic acid which comprises converting acetic acid into the corresponding ester and alcohol by conducting vapors of acetic acid in admixture with hydrogen over a catalyst containing essentially a difficultly reducible oxide and a readily reducible oxide at a temperature of about 340° C., and at substantially atmospheric pressure.

12. A process for the treatment of acetic acid which comprises converting acetic acid into the corresponding ester and alcohol by conducting vapors of acetic acid in admixture with hydrogen over a catalyst containing essentially chromium oxide, copper oxide and a dehydrating substance at a temperature of about 340° C., and at substantially atmospheric pressure.

STEFAN GOLDSCHMIDT.
ERICH LITTMANN.